Nov. 21, 1944.   C. A. NICOLLE   2,363,014
PACKING MACHINE
Filed April 17, 1939   9 Sheets-Sheet 1

Fig. 1.

Inventor:
CHARLES A. NICOLLE

By Watson, Cole, Grindle & Watson
Attorneys

Nov. 21, 1944.  C. A. NICOLLE  2,363,014
PACKING MACHINE
Filed April 17, 1939  9 Sheets-Sheet 3

Fig. 3

INVENTOR
Charles A. Nicolle
By Watson, Cole, Grindle & Watson
ATTYS

Nov. 21, 1944.  C. A. NICOLLE  2,363,014
PACKING MACHINE
Filed April 17, 1939  9 Sheets-Sheet 5

INVENTOR
Charles A. Nicolle
By Watson, Cole, Grindle & Watson
ATTYS Nov. 21, 1944.  C. A. NICOLLE  2,363,014
PACKING MACHINE
Filed April 17, 1939  9 Sheets-Sheet 7

INVENTOR
Charles A. Nicolle
By Watson, Cole, Grindle & Watson
ATTYS

Nov. 21, 1944.  C. A. NICOLLE  2,363,014
PACKING MACHINE
Filed April 17, 1939  9 Sheets-Sheet 9

Fig. 16

INVENTOR
Charles A. Nicolle
By Watson, Cole, Grindle & Watson
ATTYS

Patented Nov. 21, 1944

2,363,014

UNITED STATES PATENT OFFICE 2,363,014

PACKING MACHINE

Charles Alexandre Nicolle, Montrouge, France; vested in the Alien Property Custodian Application April 17, 1939, Serial No. 268,442
In France April 20, 1938

11 Claims. (Cl. 226—2)

The present invention has for its object means for packing identical articles such as tablets, pills and the like into recipients or containers made of plastic material which has previously been shaped into plates, bands and the like.

Such containers or wrappers of plastic material, preferably cellulose materials, are made, as it is well-known of plates or bands in which cavities are formed by suitable pressing or moulding, for receiving the articles. A wrapper may comprise either two complementarily recessed sheets which, when superimposed, result in a completed wrapper, or a single recessed sheet and a flat sheet laid thereon.

After the recesses have been filled up with the articles, the wrappers are closed up or sealed by means of a suitable press, the exertion of whose pressure may be accompanied by the action of heat and even with the action of a solvent or of a special glue preliminarily spread over the flat sheet.

The object of this invention is to provide a machine for carrying out mechanically and successively the operations of filling the wrappers and sealing them by means of the press, these two operations following one another without interruption so that the machine works in a continuous manner.

The portion of the machine in which is carried out the mechanical filling of the wrappers comprises the following principal elements:

(a) a feeder of sloping chute type which brings the articles to be packed to a distributor movable under the outlet of the feeder which lays the articles into holes provided in the distributor;

(b) a mechanism for bringing the distributor step by step under the feeder, to be filled up with the articles;

(c) the distributor itself, arranged in such a manner that whenever it is brought to a position exactly above the packing press plate, it automatically empties its content which falls into the cavities of the plastic wrapper preliminarily disposed on the press plate.

The portion of the machine in which is carried out the closing up or sealing of the wrappers, is constituted by the combination of a hot press with a device for conveying the moulds or dies, arranged so as to cause the moulds containing the wrapper to be sealed to successively pass in the press, a stop position being especially provided for cooling the moulds, after they leave the press. The invention furthermore comprises means for rapidly heating and cooling the various portions of the moulds.

Figure 1:
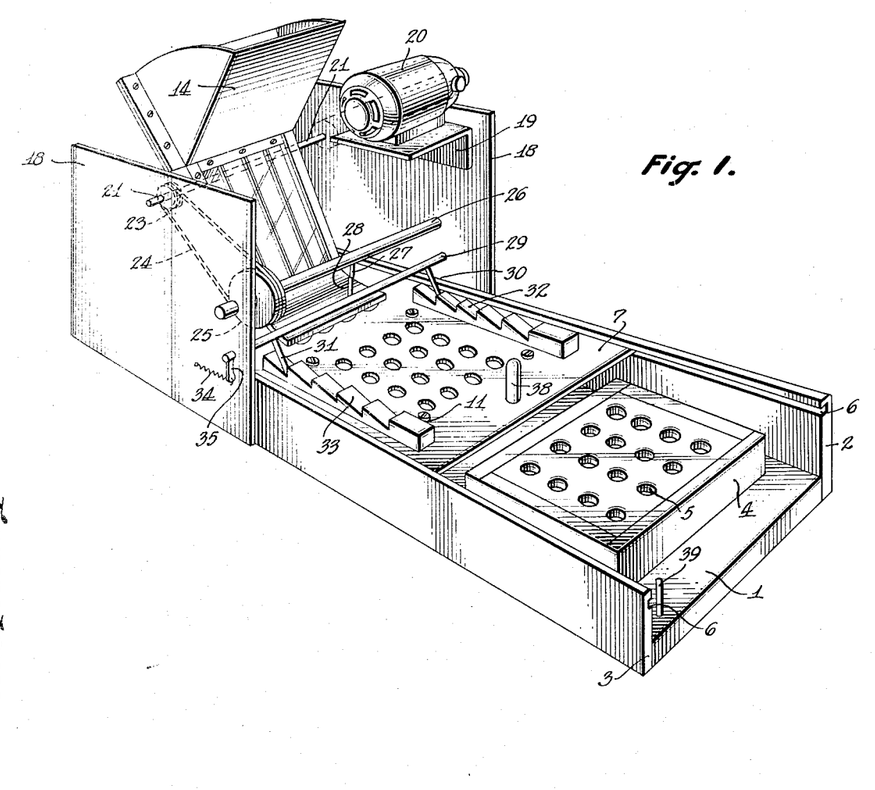
Fig. 1 is a general perspective view of one embodiment of the apparatus for mechanically filling the wrappers, the press not being shown in this figure.
Figure 2:
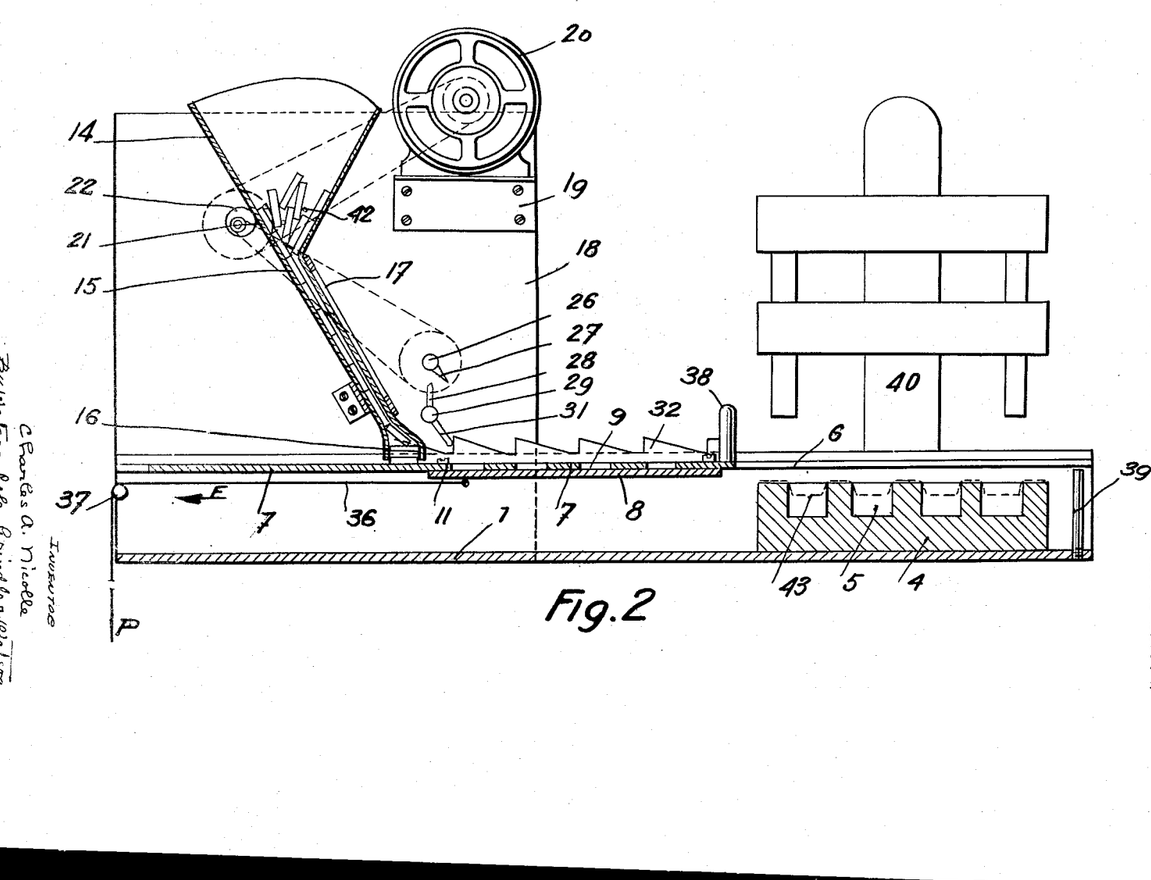
Fig. 2 is a longitudinal section of the apparatus, the press being shown diagrammatically.
Figure 3:
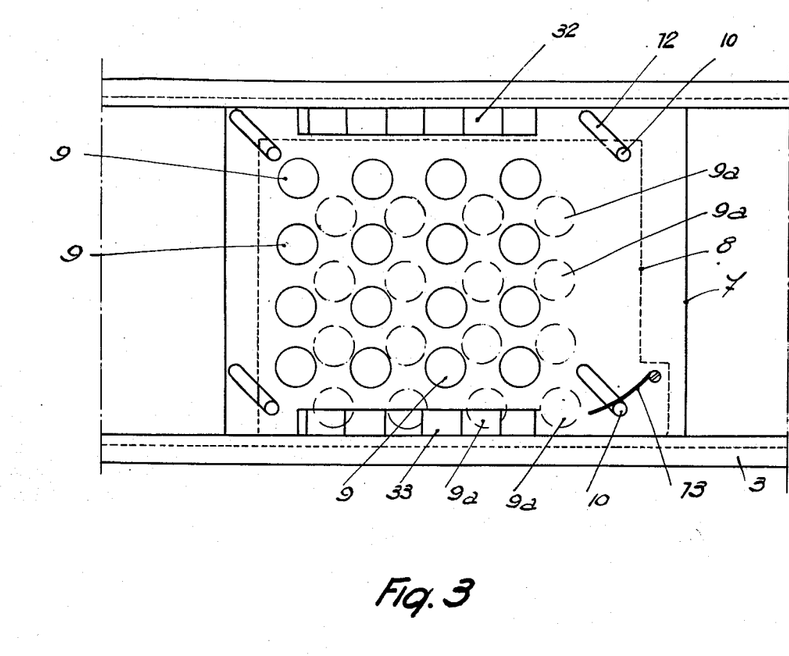
Fig. 3 is a plan view of the distributor.

In its first embodiment the apparatus for mechanically filling the wrappers comprises a frame constituted, for instance, by an elongated base plate and vertical side walls 2 and 3 extending throughout the entire length of the base. This frame supports the lower stationary press plate 4 having a number of cavities 5 corresponding in number and disposition to the number of articles to be packed up by one single operation, as provided for on one packing sheet. Each of said side walls of the frame has a longitudinal groove 6 to form two guides for a distributor which may thus travel along the frame of the machine. This distributor comprises two superimposed plates 7 and 8, the individual thickness of which is equal to the thickness of a tablet or to the diameter of a pill, if pills are handled. The upper plate 7 of the distributor has a number of rows of holes 9 conforming to the dimension of the articles to be packed up, tablets, pills or the like, said holes being disposed in the same manner as the cavities 5 of the press plate 4. The lower plate 8 of the distributor has the holes 9a corresponding in number and disposition exactly to the holes 9 of the upper plate 7. The holes 9a of the plate 8 normally are not opposite to the holes 9 of the upper plate, but are off-set diagonally as shown in Fig. 3, so that the holes 9 are obstructed by the lower plate (Fig. 2). The lower plate 8 may be shifted diagonally under the plate 7 to bring its holes 9a in alinement with those of the upper plate. For this purpose, the two plates 7 and 8 are united by four bolts 10 screwed into the plate 8, having their heads 11 in abutting engagement with the upper face of the plate 7. The latter is provided with four oblique slots 12 inclined at 45°, so that the plate 8 may slide horizontally under the plate 7. The length of the slots 12 is such as to enable the holes 9a to come exactly under the holes 9 of the upper plate 7. The plate 8 is normally held in its off-set relation to the plate 7 by a spring 13 pressing against one of the bolts 10 (Fig. 3).

Above the distributor just described, is disposed an automatic feeder arranged as follows:

This feeder comprises a hopper 14 extending in the direction of the width of the machine and tapering towards its base into a narrow slit, the opening of which corresponds to the thickness of a tablet or to the diameter of a pill. Below this slit the hopper is prolonged by a sloping chute 15 the passage height of which is equal to the thickness of a tablet; the lower end of this chute terminates in an outlet 16 at the level of the top of the distributor plate 7. In the direction of the width of the machine, the chute 15 is divided by partitions into a number of gutters, for instance four gutters which correspond to the number of rows of holes 9 in the distributor. The top 17 which forms a cover for said gutters is preferably of glass or another transparent material so that the descent of the tablets or pills may be watched. The outlet 16 is shaped so that the tablets which slope down in the chute 15 get themselves horizontal before lying down on the plate 7. On the other hand, the upper ends of the little partitions separating the different gutters of the chute 15 are sharpened into points, whereby each tablet, owing to unstable equilibrium when it meets those points, falls down into one of the gutters.

The framework of the apparatus is provided at one of its ends with two lateral cheek plates 18; to one of them is secured a bracket 19 supporting a motr 20 which is shown as an electric motor, but which may also be a spring motor or any other prime mover. This motor drives a transverse shaft 21 provided with an eccentric 22 (Fig. 2) for the purpose of imparting a vibrating movement to the hopper 14 which bears upon said eccentric. On the shaft 21 is secured also a pulley 23 which, by means of a belt 24 and a second pulley 25, rotates a transverse shaft 26 supported by the two cheek plates 18 and provided with a finger 27. This finger 27 is arranged so as to strike, when rotating with shaft 26, against a finger 28 set on a third transverse shaft 29, which it drives on a short distance and then releases. The shaft 29, in its turn, is provided, close to the cheek plates 18, with two pawls 30, 31, engaging the teeth of two indented racks 32, 33, respectively mounted on the top of the upper plate 7 of the distributor. A spring 34 pulling a small lever 35 secured to the end of the shaft 29 normally holds the pawls 30, 31 in engagement with the teeth of the racks 32, 33. The distributor 7—8 may be moved in the direction of the arrow F (Fig. 2) by tractive power of a rope 36 attached to the plate 8 passing over a pulley 37, and having a counter-weight at its free end P. For the purpose of moving in the direction opposed to the arrow F, the distributor 7—8 is provided with an operating pin handle 38, and a stop member 39 for the plate 8 of the distributor is provided at the outer end of the frame. The press is indicated in a general way by 40 (Fig. 2) being disposed above the stationary mould or die 4.

The operation of the apparatus is as follows:

At rest, the distributor 7—8 is in the position shown in Fig. 2. A certain quantity of tablets, as may be desired, is from time to time charged into the hopper 14. Before this operation the tablets may have been placed in bulk on a sloping tray provided with a suitable slide gate operated by hand or automatically to allow the tablets to pass into the hopper. The motor 20 is then started. The eccentric 22 causes the hopper to bob thus promoting the entering of the tablets into the chute 15. To avoid stoppage and wedging up of the tablets, the inside of the hopper is provided with a number of rods having smooth surfaces 42 (or with a number of scattered spattle rods which may be moved from the motor). The tablets descend in the gutters formed within the chute 15, in as many rows as there are gutters, and on reaching the bottom of said gutters, they lie down flat on the top of the plate 7 of the distributor, owing to the form of the part 16.

The distributor 7—8, as already described, tends to be moved in the direction of the arrow F by the counter-weight P, but it is normally held stationary by the two pawls 30—31 which are in engagement with the teeth of the racks 32—33. The finger 27 on the shaft 26 causes, at each turn, the finger 28 of the shaft 29 to be moved a small distance and then to escape. The finger 28, when driving the shaft 29, disengages the pawls 30—31 from the two racks 32—33 thereby permitting the distributor 7—8 to advance by one tooth length in the direction of the arrow F. As soon as this advance is effected, the distributor comes to stop again, and the first transverse row of holes 9 of the plate 7 takes position under the gutters of the chute 15, so that the tablets immediately fall into these holes. At the following escapement of the pawls 30—31 from the racks 32—33, the distributor 7—8 advances again by one tooth and a new row of holes 9 is filled up and so on until the distributor is completely loaded.

At this point, the operator seizes the operating handle 38 and slides the distributor 7—8 toward the right (Figs. 1 and 2). During this movement of the distributor, the falling of the tablets contained in the feeder is stopped by the non-perforated portion of the plate 7, the lenbth of which is conveniently adapted for this purpose. The displacement of the distributor towards the right is automatically stopped by the contact of the lower plate 8 with the stop member 39. This contact causes the lower plate 8 to stop first, while the upper plate 7 may still move on through a small distance. This relative displacement of the plates 7—8 results, owing to the disposition of the slots 12 and the bolts 10, in causing the lower plate 8 to slide diagonally under the upper plate 7 and to bring all the holes 9a of the lower plate in alinement with the holes 9 of the upper plate. In other words, all the holes 9 which contain the tablets open at the bottom so as to cause the tablets to immediately fall into the cavities of the wrapper 43 which has previously been laid on the lower press plate 4 (Fig. 2) positioned as shown. The operator then brings the distributor 7—8 to the left and a new phase of filling of the distributor may begin again. While said new filling process is going on, a cover of flat sheet material is laid upon the sheet 43 for closing the wrapper and these two elements of the wrapper are then united under the press in the known manner.

Figures 4 to 10 show a modified form of the apparatus just described, said modified form showing the following outstanding features:

While in the first embodiment of the apparatus the articles contained in the hopper progress practically in a continuous manner within the gutters of the sloping chute of the feeder, their passage in the second described embodiment of the apparatus is effected at definite time intervals, in synchronism with the displacements of the distributor placed at the bottom of the feeder. This is obtained by means of a gearing operated by a hand lever placed at one side of the apparatus and arranged so as to cause, simultaneously with the movement of the distributor to the position in which it evacuates its contents, the displacement of an endless band which receives from the hopper a determined quantity of articles and discharges the same into the feeder.

Another feature of the present embodiment of the apparatus consists of a device which, placed at the lower end of the feeder, prevents the articles coming out of the gutters from getting in contact with the distributor before said movement of the distributor to discharging position is finished.

In the present embodiment, the apparatus is mounted upon a working bench comprising a table plate 50 and the legs 51. The motor 20, instead of being placed upon a bracket secured to one cheek plate 18, is installed inside of the bench which may be partially closed. As in the first embodiment of the invention, the distributor is formed by two plates 7—8 sliding one upon another and having through bores 9 and 9a. The upper plate 7 is pulled back by the rope 36 passing over the pulley 37 and pulled down by a counter-weight P attached to its end. In the present embodiment, the distributor instead of being guided in side grooves of the frame work, is guided between rollers 52. The racks 32'—33' are transferred to the lower face of the plate 7, and each of the pawls 30'—31' which permit the racks to escape tooth by tooth, receives its oscillating movement from a tickler or pusher 53 guided through a socket 54 in the table plate 50, and the ticklers or pushers 53 bear upon the surfaces of two cams 55—56 secured on a transverse shaft 57 bearing a pulley 58 which is rotated through the pulley 59 of the motor through the belt 60. Another transverse shaft 61 is provided outside of the frame work, with a control lever 62 for operating by hand the displacements of the distributor in the direction of the arrow F, that is to say from the left to the right as per Fig. 4. For this purpose, a gearing is established in the interior and at each side of the frame, said gearing comprising a toothed sector 63 secured on the transverse shaft 61, a spur wheel 64 in engagement with said sector and mounted on a second transverse shaft 65, and another gear wheel 66 secured on a third transverse shaft 67, and each of the latter gear wheels 66 is in engagement with a toothed rack 68 secured to the lower surface of the distributor plate 7. The lower plate 8 of the distributor is provided with a convenient stop member 69 adapted to strike against the stop member 39 when the distributor reaches the end of its stroke. Closely spaced above the top of the distributor is the feeder which is characterized, firstly by the fact of being separated from the hopper 14, and secondly by the fact of being mounted elastically for the purpose of responding to the action of a vibrator 70 which may be constituted, for example, by a trembler of the electric bell type or the like. For this purpose, the feeder is supported by means of one or several angular members 71 secured to its back face and one or several springs 72 and 73 mounted on a cross-bar 74, and the tension of these springs is controlled by a nut 75 screwed on a threaded rod 76 disposed in the interior of each spring. The feeder terminates, close to the distributor, in a box portion 77 in which are provided as many passages or openings 78 as there are descent gutters in the feeder, said openings corresponding by spacing to the holes 9 and 9a of the distributor plates 7—8.

Figure 8:
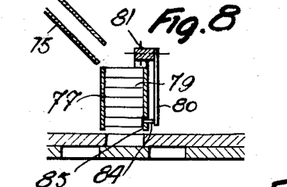
Fig. 8 is a detail in cross-section of the lower portion of the feeder.
Figure 9:
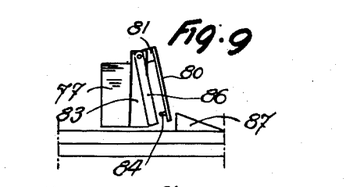
Fig. 9 is an outer end view of the same portion.
Figure 10:
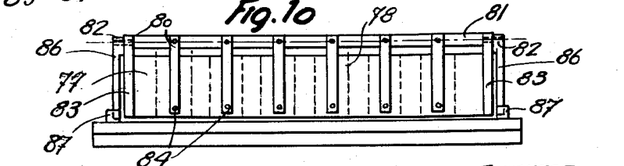
Fig. 10 is an outer front view of the same portion, viewed from the end of the machine.

Figs. 8, 9 and 10 show on an enlarged scale said box portion of the feeder with the special arrangement provided therein for preventing, at a certain moment of the operation, the articles such as tablets or the like 79 piled up in the openings 78 of the box portion from reaching the distributor. Said arrangement comprises a number of blades 80 made of any convenient material and spaced exactly as are spaced the openings 78 of the block; these blades are placed behind the box facing each of the openings. Said blades 80 are mounted on an oscillating bar 81 prolonged at both ends by an axle 82 extending through a support 83. Furthermore, each blade has near its lower end a little finger 84 or a projecting point extending through a hole 85 opening into the corresponding hole 78 of the box and adapted to slightly penetrate into said hole 78 at the outer sides of the supports 83 each oscillating axle 82 of the bar 81 is provided with a leg or lever 86 which, through the action of the stop members 87—88 placed on the plate 7 of the distributor, may take two positions, one which corresponds to the penetration of the finger or projecting point 84 into the openings 78 and the other one corresponding to the removal of these fingers from said openings, as will be explained hereafter. A braking or retaining device may be provided for maintaining the legs 86 in said two positions.

Figures 4, 5, 6:
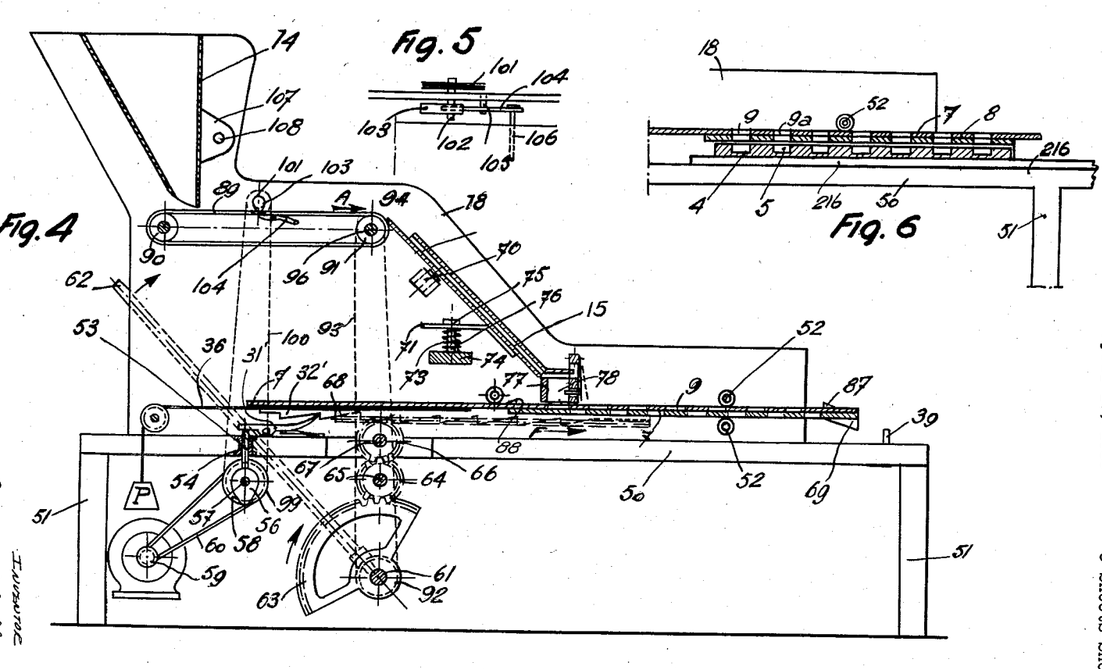
Fig. 4 is a side view of a second embodiment of the same apparatus, partly in longitudinal section.
Fig. 5 illustrates a detail of Fig. 4.
Fig. 6 is a fragmentary vertical sectional view of a portion of a machine illustrated in Fig. 4 showing the distributor in another position.
Figure 7:
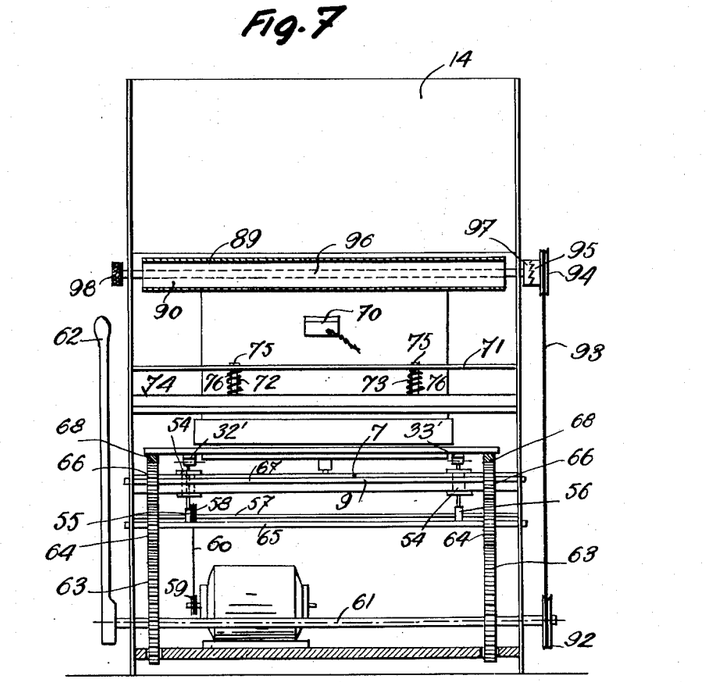
Fig. 7 is an end view of the machine, partly in cross-section.

In the present embodiment of the invention, the hopper 14 is separated from the feeder, and it deposits its contents upon an endless band 89 stretched over two rollers 90—91. Said band 89 receives an intermittent advancing movement synchronized with a taking movement of the distributor toward loading position by means of a pulley 92 secured to the transverse shaft 61 at the end opposed to the end bearing the lever 62, a belt or rope 93 and a second pulley 94 forming a part of one half 95 of a ratchet-coupling that can turn loosely on the shaft 96 of the roller 91, while the other half 97 of this coupling is secured to said shaft 96. The teeth of the coupling 95—97 are cut so as to cause the endless band 89 to move but in the forward direction indicated by the arrow A (Fig. 4). The endless band 89 may also be moved forward by hand for the purpose which will be set forth herein below, by rotating a milled knob or the like 98 secured to the axle 96 of the roller. Of course, the half 97 of the coupling must be capable of sliding on its axle in order that its teeth can escape from those of the other half of the coupling, while the milled knob 98 is turned backward.

To prevent the tablets from adhering to the surface of the endless band, a rapid vibrating movement is imparted to the band by means of the following device shown in detail in Fig. 5. On the transverse shaft 57 is secured a pulley 99 which through a belt or rope 100 drives a second pulley 101 mounted at the outer side of the cheek plate 18 on an axle 102 to which it transmits its rotating movement. On the axle 102 and close to the inner face of the cheek 18 is secured a cam 103 upon the surface of which bears a double-armed lever 104 which oscillates about a pivot 105. To the lever end 104 which does not contact with the cam 103 is secured a vibrator finger 106 placed under the upper portion of the endless band 89 and extending only a small distance under the band. When the motor 20 is set in motion, the rapid rotation imparted to the cam 103 causes, through the lever 104, the band to be rapidly flapped by the finger 106 and, owing to the rigidity this endless band must necessarily possess, the resultant vibrations are transmitted throughout the length of the band and prevent the tablets from adhering to said band.

Finally in order to disengage the tablets or the like or chippings thereof which may become wedged in between the lower end of the hopper 14 and the endless band 89, the hopper 14 is not mounted rigidly on the machine but is provided with the lugs 107 enabling it to turn about an axle 108 for the purpose of adjusting the feed delivery or else removing the hopper from the machine if necessary.

The operation of the apparatus is as follows:

At rest, the apparatus is in the position shown in Fig. 4. The feeder and the distributor are entirely empty of articles to be packed, but a supply thereof is in the hopper 14.

In order to start the apparatus, the operator turns the knob 98 to move toward the right band 89 on which are deposited the articles coming out of hopper 14, said articles then falling into the gutters of the chute 15. When said gutters are filled, the operator stops the movement of the band 89. The tablets or the like are stacked in the openings 78 of the box portion 77 of the feeder and the lower tablets descend into the first row of holes 9 of the plate 7 of the distributor. The motor 20 is then started so that, by action of the cam 56 and the pusher 53, the pawls 30'—31' take up an oscillating movement which causes the racks 32'—33', i. e., the whole of the distributor to move toward the left. The rows of holes 9 in the distributor plate 7 are thereby successively filled as in the first described form of the apparatus. At the same time, the vibrator 70 acts upon the chute 15 of the feeder to promote the descent of the tablets and the second vibrating device comprising the cam 103, and the finger 106 acts upon the movable band 89. When the distributor 7—8 reaches the inner end of its stroke to the left (Fig. 4), the stops 87 operate upon the two levers 86 whereby the points 84 penetrate into the openings 78 or into the gutters, thereby stopping the further descent of tablets; the purpose of this arrangement is to permit the distributor filled up with tablets to freely return toward the right without risk of marring the tablets.

When the distributor is filled or loaded, the operator pulls the control lever 62 in the direction of the arrow thereby moving the distributor to the right (Fig. 4) through the spur gears 63—64—66 and the racks 68. Towards the end of the stroke of the distributor toward the right the stop 69 secured to the lower plate 8 of the distributor strikes the stop member 39 so that the upper plate 7 alone continues to move until the holes 9 and 9a of the distributor are in alinement and the tablets fall into the wrappers previously placed in the cavities 5 of the mould 4 (Fig. 2). Similarly, when the distributor 7—8 arrives near the end of its movement to the left, the stop 88 operates upon the lever 86 which results in retracting the points 84 and setting free the lower tablets which are within the openings 78 and which then fall into the holes 9 of the plate 7 of the distributor. The working cycle may then be started again as above described.

Once filled up the moulds 4 are carried over to the machine for sealing or closing the wrappers, this machine being placed close to the charging machine above described.

Figure 11:
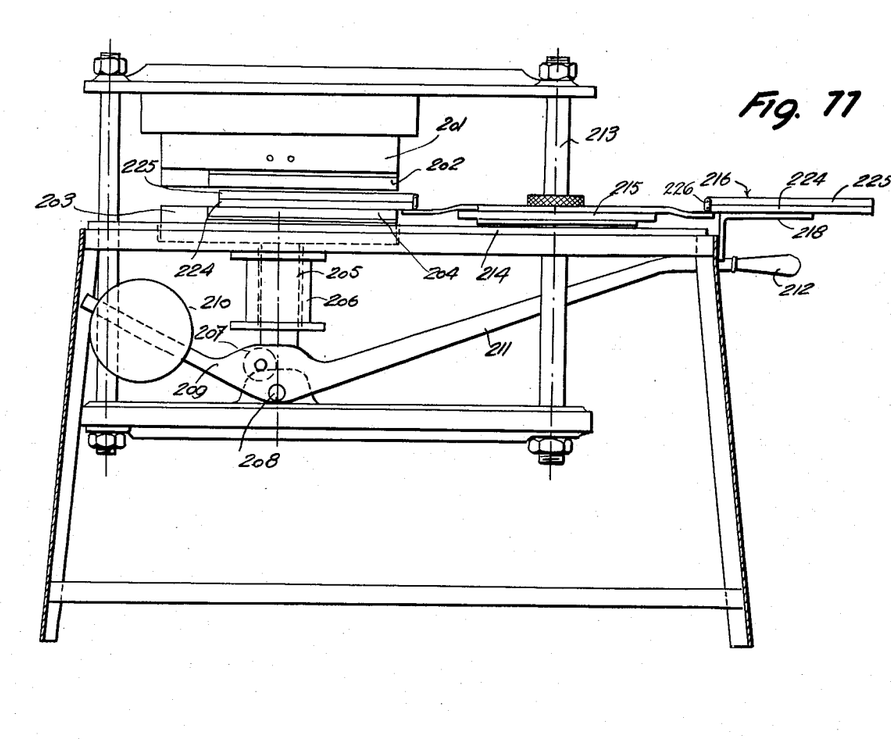
Fig. 11 is a side view of the portion of the machine for sealing or closing the wrappers.
Figure 12:
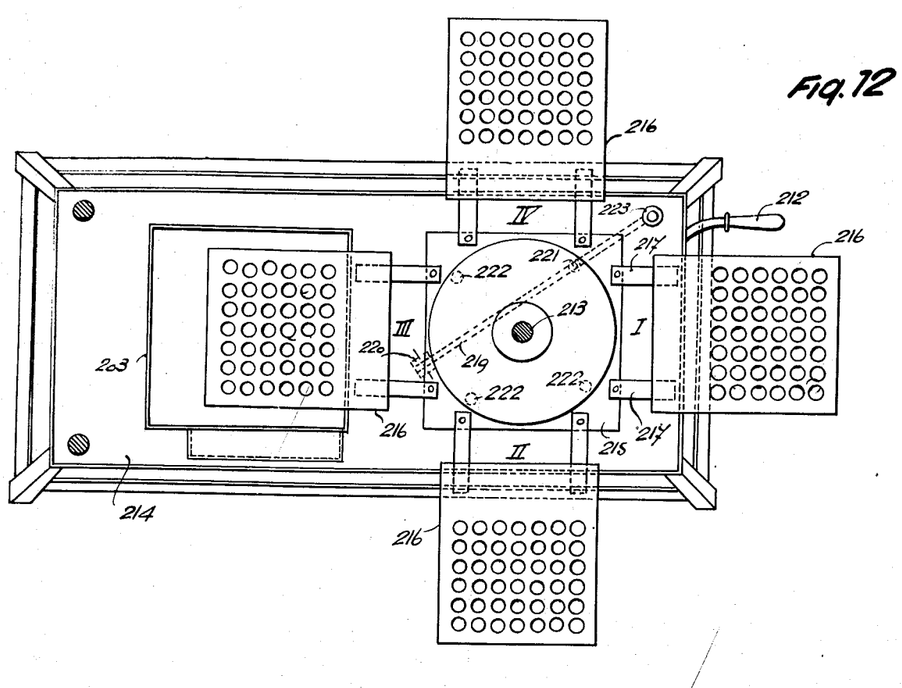
Fig. 12 is a top view of Fig. 11.

Such a sealing machine is shown in Figs. 11 and 12 of the accompanying drawings, one of the constituent elements thereof being a hot press of any known type, is characterized by sealing moulds or dies adapted to travel across the machine along a circular path comprising a number of stands, at least one of which is specially provided for the cooling operation. Another feature of this machine resides in that the moulds are thin, entirely independent of the heating plates of the press, the molds being of a very much reduced mass and made of a material which can rapidly grow hot or cold, such as "duralumin," so that the articles contained in the wrappers are exposed to high temperature for as short a time as possible. Special arrangements may be provided for removing hot expanded air from the moulds so as to protect the articles to be packed from noxious effects of hot air during the stay of the moulds or dies between heating press plates.

As stated above, the hot press may be of any known type. In the present example, the press comprises a stationary upper frame 201 carrying the upper heating plate 202, and a movable lower plate 203 supporting the lower heating plate 204. Normally the plates 202 and 204 are spaced from each other as is shown in Fig. 11, in order that the dies or moulds may be easily passed between them. The lower plate 203 is supported by a piston 205 guided in a socket 206, and resting on a lifting cam 207 formed on a double-armed lever turnable on a pivot 208 and whose small arm 209 bears a counter-weight 210, while its longer arm 211 terminates in an operating handle 212.

On the axle 213 passing through the table 214 of the machine is mounted, a small distance above the table, a revolving plate 215 which in the present example is four-sided. Opposite to each side of the revolving plate 215 is placed a mould 216 supported by two straps 217 secured to the plate 215. Said straps may be flexible, to a certain extent, to permit the moulds 216 to be compressed without being wedged in between the heating plates 202—204 of the press. Brackets such as 218 (Fig. 11) may be fixed to the end sides of the machine to support the moulds or dies at their different stations. The revolving plate 215 is held fast at each of its four stations by a lever 219 (Fig. 12) turning upon a pivot 220 under the table 214 and provided with a stop finger 221 which may be engaged in one of four holes 222 bored in the lower face of the plate 215. The disengagement of the revolving plate is effected by pressing a button 223 fixed to the end of the lever 219 and extended above the upper level of the table 214. The lever 219 is controlled from underneath by a spring not shown.

The moulds 216, of which Fig. 12 shows but the lower portion, which in the present example are provided with a number of cavities, comprise a lower or supporting die 224 and an upper counter-die 225. These two die portions may be independent one of another and in that case marking pins will be employed to correctly close up the die, or else they may be hinged together as shown at 226 in Fig. 11. As already stated, they are made of a metal rapidly growing hot or cold, such as, for instance a kind of aluminium known as "duralumin," and they also have a reduced metal mass to hasten heating and cooling thereof.

The operation of the machine is as follows:

At station I, the operator receives the mould coming from the station IV where it cooled. He takes up, and then places in the supporting die 224, a new lower packing sheet and sends the mould to station II where the cavities are filled with articles mechanically with the aid of the apparatus arranged close alongside of the machine which apparatus is the one described with reference to Figs. 1 to 3 or Figs. 4 to 10.

As soon as the filling operation is finished, the operator places the upper sheet or cover 227 of the packing and moves the closed up mould over to station III between the heating plates 202—204 of the press, whereby, the lever 211 being depressed by the operator, the mould is compressed and heated to produce the sealing of the wrapper. During this operation, the mould which previously was at station III is held stationary at station IV to cool, the cooling time being used for the dismounting of, and placing a new packing sheet in the mould at station I. In this manner the apparatus enables working in a continuous cycle of successive steps and without loss of time.

Figure 13:
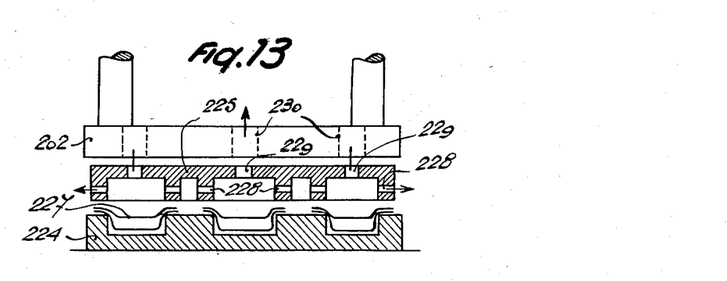
Fig. 13 is a detail view of a mould or die with the means for air escape therefrom.
Figure 14:
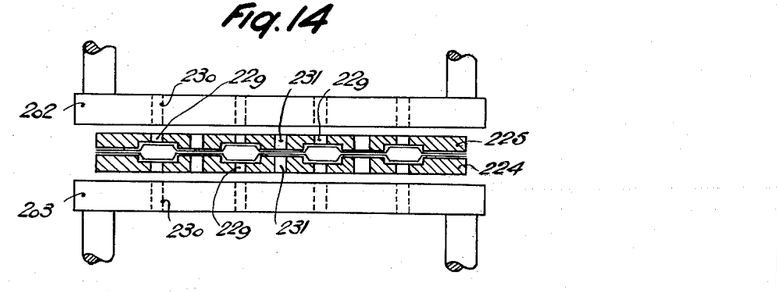
Fig. 14 is a cross-sectional view of a modified form of the mould of Fig. 13.
Figure 15:
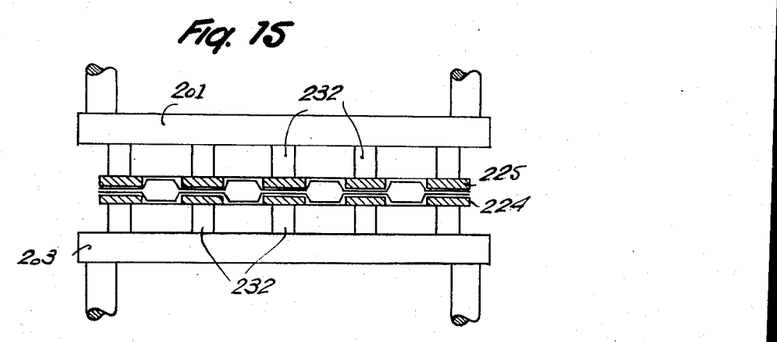
Fig. 15 shows in cross-section a particular way of heating a mould.

Figs. 13, 14, and 15 show several modified forms of moulds which may be employed with the machine, together with arrangements therein for securing the wrappers, to be sealed against effects due to expansion of heated air and also for diminishing the metal mass of the mould itself.

Fig. 13 shows individual packings having individual covers 227 and a lower die 224 seated directly on a heating plate.

The counter-die 225 has, as shown in Fig. 13, cavity portions opposed to the cavities of the lower die 224. As the expansion of the air confined in said cavity portions may deform by pressure the covers 227, since the latter are softened because of their stay in a strongly heated atmosphere, it may then be necessary to provide lateral air escape holes, such as 228, or vertical holes such as 229, the latter being prolonged by air escape holes 230 provided in the upper press plate 202 (Fig. 13). The deforming of the covers 227 is thus prevented.

Fig. 14 shows a wrapper formed of two plates provided with cavities. The die which is formed by two portions 224—225 is placed between the heating plates 202—204 of the press, as described with reference to Figs. 11 and 12. Here, the two portions are provided with the air escape holes 229 prolonged by the holes 230 provided in the two heating plates, but in addition alleviation holes 231 are made in the die portions comprised between wrappers for the purpose of diminishing the die metal mass which will thereby grow hot or cold more rapidly.

In the modified form shown in Fig. 15, the halves of the die instead of being heated by direct contact with the heating plates 201—203, are heated by means of cylinders or otherwise shaped members 232 extended from the heating plates or coming into abutment engagement with the die portions corresponding to the zones where the sealings are to be operated. The Figure 15 shows that in the present case the die appears to be extremely lightened and that special air escape holes are superfluous, since the air may freely circulate between the heating members 232.

Figure 16:
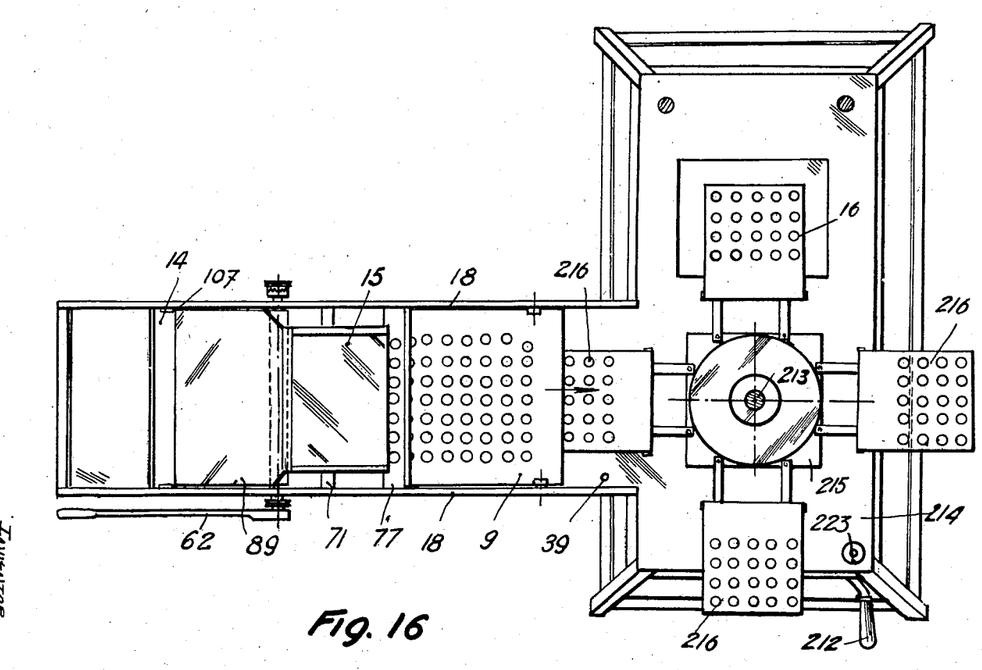
Fig. 16 is a general top plan view of the entire machine.

Referring to the machine, shown in Fig. 16 it will be noted that the press is mounted on the frame 50 of the filling apparatus in such a manner that the revolving plate 215 is level with the table and that the moulds 4 move into position under the distributor exactly as shown in Fig. 6. This press may be used for sealing any simple cellulose packing or packings constituted by several material thicknesses with interposed impermeating layer.

Having now particularly described and ascertained the nature of my said invention and in what manner the same is to be performed, I declare that what I claim is:

1. For use in a machine for the continuous mass packing of identical articles such as tablets, pills, or the like, into cellulosic or other plastic wrappers in the form of sheets, plates, or bands, which comprises means for mechanically filling said wrappers with said articles, and means for closing and sealing said wrappers after they are filled, said last named means including a mold block containing a plurality of moulds arranged in a definite pattern; a filling device comprising two superimposed reciprocally sliding plates each provided with openings for receiving said articles, conveying means for feeding the articles onto said plates, means for moving said plates step by step beneath said conveying means to successively fill the openings therein, means for guiding said plates in movement to and from positions beneath said conveying means, the openings in the two superimposed plates being out of registry during the movement of the plates, whereby the articles are retained within the openings of the upper plate by solid portions of the lower plate, and means for bringing the openings of the two plates into registry when the latter are moved to their discharging position.

2. For use in a machine for the continuous mass packing of identical articles such as tablets, pills, or the like, into cellulosic or other plastic wrappers in the form of sheets, plates, or bands, which comprises means for mechanically filling said wrappers with said articles and means for closing and sealing said wrappers after they are filled, the last named means including a mold block containing a plurality of battery moulds arranged for successive use; a filling device comprising two superimposed relatively sliding plates each provided with openings for receiving said articles, and means for feeding the articles onto the upper plate comprising conveying means, means for moving said pair of plates step by step relative to said conveying means to successively fill the openings in the upper plate, means for slidably guiding said plates for movement to and fro relative to said conveying means, the openings in the two superimposed plates being normally out of registry whereby the articles are retained within the openings of the upper plate by solid portions of the lower plate, and means for moving one of said plates diagonally with respect to the other in a manner to register the openings of the two plates whereby the articles can discharge from said pair of plates to one of said moulds.

3. For use in a machine for the continuous mass packing of identical articles such as tablets, pills, or the like, between cellulosic or other plastic wrappers in the form of sheets, plates, or bands, which comprises means for mechanically placing articles between the wrappers, and means for closing and sealing said wrappers around the articles, the last named means including a movable mould block containing a plurality of moulds symmetrically arranged for successive use; a filling device comprising a pair of superimposed relatively slidable plates each provided with openings for receiving said articles, said plates normally being disposed with their openings out of registry, means for feeding the articles to said plates, means for moving said pair of plates step by step relative to the feeding means and in a direction to successively fill the openings in the plates, means for guiding said pair of plates in directions toward and away from said feeding means, means constantly urging said pair of plates toward said feeding means, means permitting moving said plates in the opposite direction to a delivery point, and a stationary abutment at said delivery point for arresting one of the plates and permitting the remaining plate to continue in the last mentioned direction in a manner to bring the openings of the two plates into registry to effect the discharging of said articles therefrom.

4. A machine for the continuous mass packing of identical articles such as tablets, pills, or the like, into cellulosic or other plastic wrappers in the form of sheets, plates, or bands, said machine comprising, in combination, a device for mechanically filling said wrappers with said articles, said filling device comprising an arranging tray provided with a plurality of rows of openings for receiving said articles, and means for feeding the articles to said tray, said feeding means including an inclined chute discharging onto said tray, means for moving said tray step by step beneath said chute to successively fill the rows of openings therein, means for moving said tray in the opposite direction to a delivery point, said chute comprising an apertured member disposed adjacent the lower end of the chute through the apertures of which the articles can pass, detent elements adapted to be projected across said apertures to halt the descent of the articles during movement of the tray, and abutment means carried by said tray for moving the detent elements into operative position upon completion of a step movement of the tray, and retracting said detent elements at the recommencement of a succeeding step movement of said tray.

5. A machine for the continuous mass packing of identical articles such as tablets, pills, or the like, into cellulosic or other plastic wrappers in the form of sheets, plates, or bands, said machine comprising, in combination, a device for mechanically filling said wrappers with said articles, said filling device comprising an arranging tray provided with a plurality of rows of openings for receiving said articles, and means for feeding the articles to said tray comprising, an inclined chute discharging onto said tray, means for moving said tray step by step beneath said chute in one direction to successively fill the rows of openings therein, means for moving said tray in the opposite direction to a delivery point, an endless belt conveyor disposed at the upper end of said chute and intermittently operable to transfer articles onto said chute, means for moving said endless belt conveyor synchronously with the delivery movement of said tray, means for vibrating said endless belt conveyor, and additional means permitting moving said endless belt conveyor independently of the movement of said tray.

6. For use in a device for the wrapping and packing of identical articles such as tablets, pills, or the like, into wrappers which comprise superposed sheets of thermo-plastic material between which the articles are arranged in a plurality of rows according to a predetermined pattern, a sealing means which comprises a mould, said mould comprising a pair of hinged plates, said plates having registering recesses formed therein, said recesses being arranged in a pattern corresponding to the arrangement of the articles between said wrapper sheets, air escape openings communicating with said recesses, press members provided with a plurality of heat conducting blocks adapted to contact each of said mould plates and ensure rapid heating of the portions of the mould limited to the areas of the sheets to be secured together.

7. For use in a device for the wrapping and packing of identical articles such as tablets, pills, or the like, into wrappers which comprise superposed sheets of thermo-plastic material between which the articles are arranged in a plurality of rows according to a predetermined pattern, a sealing means which comprises a revolving support having radial extensions, each carrying a mould for supporting a wrapper of the type described containing articles arranged in spaced rows, means for arranging articles and wrappers on said mould for sealing, a press comprising two vertically spaced members between which the laden moulds may be positioned by rotating said support, and means for heating said members and for bringing them into contact with said mould to apply heat and pressure thereto.

8. A sealing arrangement as described in claim 7 in which the radial extensions of the rotatable support are vertically resilient, whereby the moulds may undergo slight displacement during the pressing operation without harm to the mould or its support.

9. In a device for packaging identical articles such as tablets, pills and the like; a support, article conveying means on said support including at least one declining chute, a substantially horizontal slide mounted on said support beneath the lower end of the chute and composed of upper and lower relatively movable plates each having at least one longitudinal row of holes for reception and passage of the articles, the row of holes in the upper plate being alined with the chute, and the holes in the lower plate normally being sufficiently displaced with respect to the holes in the upper plate by virtue of an offset position of the lower plate whereby imperforate portions of the lower plate support articles in the holes of the upper plate, means operable to move said slide step by step along said support in a direction away from the chute so as to bring successive holes of the upper plate under the chute to be filled, and an abutment on said support with which one of the plates of the slide engages after the slide has reached filled position and before the final step movement of the slide, whereby the plate engaging the abutment is arrested and the remaining plate moves to a discharging position wherein the holes of the two plates register to permit the articles to fall through the slide.

10. A device for packaging identical articles according to claim 9, wherein the lower section of a sealing mould is positioned on said support beneath the slide and is provided with cavities alined with the holes in the slide to receive the articles falling from the slide.

11. A device for packaging identical articles according to claim 9 wherein sealing means including mould means is located beneath the slide in its final position, said mould means having cavities alined with the holes in the slide to receive the articles falling from the slide.

CHARLES ALEXANDRE NICOLLE.